United States Patent
Montgomery

(10) Patent No.: US 8,817,238 B2
(45) Date of Patent: *Aug. 26, 2014

(54) THREE DIMENSIONAL FEATURE LOCATION FROM AN EXCAVATOR

(75) Inventor: James Leonard Montgomery, Dubuque, IA (US)

(73) Assignee: Deere & Company, Moline, IL (US)

(*) Notice: Subject to any disclaimer, the term of this patent is extended or adjusted under 35 U.S.C. 154(b) by 213 days.

This patent is subject to a terminal disclaimer.

(21) Appl. No.: 13/216,752

(22) Filed: Aug. 24, 2011

(65) Prior Publication Data

US 2011/0311342 A1   Dec. 22, 2011

Related U.S. Application Data

(63) Continuation-in-part of application No. 11/925,075, filed on Oct. 26, 2007, now Pat. No. 8,363,210.

(51) Int. Cl.
  *G01C 3/00*    (2006.01)

(52) U.S. Cl.
  USPC ............................................. 356/3; 356/3.03

(58) Field of Classification Search
  USPC .................................................... 356/3, 3.03
  See application file for complete search history.

(56) References Cited

U.S. PATENT DOCUMENTS

| | | | |
|---|---|---|---|
| 4,129,224 A * | 12/1978 | Teach | 414/700 |
| 4,685,054 A | 8/1987 | Manninen et al. | |
| 4,805,086 A | 2/1989 | Nielsen et al. | |
| 4,829,418 A | 5/1989 | Nielsen et al. | |
| 4,866,641 A | 9/1989 | Nielsen et al. | |
| 4,884,939 A | 12/1989 | Nielsen et al. | |
| 4,945,221 A | 7/1990 | Nielsen et al. | |
| 4,949,089 A | 8/1990 | Ruszkowski, Jr. | |
| 5,572,809 A | 11/1996 | Steenwyk et al. | |
| 5,742,069 A | 4/1998 | Steenwyk et al. | |
| 5,848,485 A | 12/1998 | Anderson et al. | |
| 5,907,111 A | 5/1999 | Josten et al. | |
| 5,953,838 A | 9/1999 | Steenwyk | |
| 6,085,583 A | 7/2000 | Cannon et al. | |
| 6,263,595 B1 * | 7/2001 | Ake | 37/348 |
| 6,480,289 B1 | 11/2002 | Shimomura et al. | |
| 6,691,437 B1 * | 2/2004 | Yost et al. | 37/348 |
| 6,736,216 B2 | 5/2004 | Savard et al. | |
| 6,826,452 B1 | 11/2004 | Holland et al. | |
| 7,139,662 B2 | 11/2006 | Ericsson et al. | |
| 7,144,191 B2 | 12/2006 | Kieranen et al. | |
| 8,363,210 B2 | 1/2013 | Montgomery | |
| 2004/0190374 A1 | 9/2004 | Alft et al. | |
| 2005/0173153 A1 | 8/2005 | Alft et al. | |

OTHER PUBLICATIONS

Thayn, Brett, "Autonomous Solutions Inc. Backhoe Documentation," 5 pages, Jan. 17, 2002.

(Continued)

*Primary Examiner* — Tarifur Chowdhury
*Assistant Examiner* — Isiaka Akanbi
(74) *Attorney, Agent, or Firm* — Faegre Baker Daniels LLP

(57) ABSTRACT

A combination of location measurement apparatuses to measure in three dimensions the location of an excavator with respect to a job site, and to further measure the location of an excavated or a topographical feature with respect to the excavator by range finding from the excavator in proximity of the feature and contemporaneously recording measurement data on a computer.

24 Claims, 10 Drawing Sheets

(56) References Cited

OTHER PUBLICATIONS

"Software Compatibility List," Laser Technology, Inc., Centennial, CO, 1 page, available at least as early as Feb. 2008.
"Rectilinear Displacement Transducer for Mounting Inside Hydraulic Actuators," Gefran spa, D'lseo Italia, 2 pages. Mar. 2006.
"About GPS Laser Ofsets," Laser Technology, Inc., Centennial, CO, 4 pages, dated 2004.
"Displacement Transducers," Gefran spa, D'lseo Italia, 20 pages, Nov. 2006.
"Forest Pro Laser," Laser Technology, Inc., Centennial, CO, 1 page, available at least as early as Feb. 2008.
"TruPulse 200," Laser Technology, Inc., Centennial, CO, 1 page, dated Apr. 9, 2007.
"TruVector 360," Laser Technology, Inc., Centennial, CO, 1 page, dated Apr. 9, 2007.
Michelsen Jr., Michael W., "Construction in the Space Age," Grading & Excavation Contractor, 11 pages, Mar. 2000.
"Laser Range-Finder," Answers.com, 4 pages, Apr. 9, 2007.
"Laser Range-Finder," Wikipedia, 3 pages, Apr. 9, 2007, available at "http://en.wikipedia.org/wiki/Laser_range-finder".
"Mapstar Angle Encoder," Laser Technology, Inc., Centennial, CO, 1 page, dated Nov. 15, 2003.
"AR1000 Laser Distance Sensor," Acuity Laser Measurement, Portland, Oregon, 2 pages, dated Aug. 2007.
"AccuRange 4000," Acuity Laser Measurement, Portland, Oregon, 4 pages, dated Feb. 16, 2007.

* cited by examiner

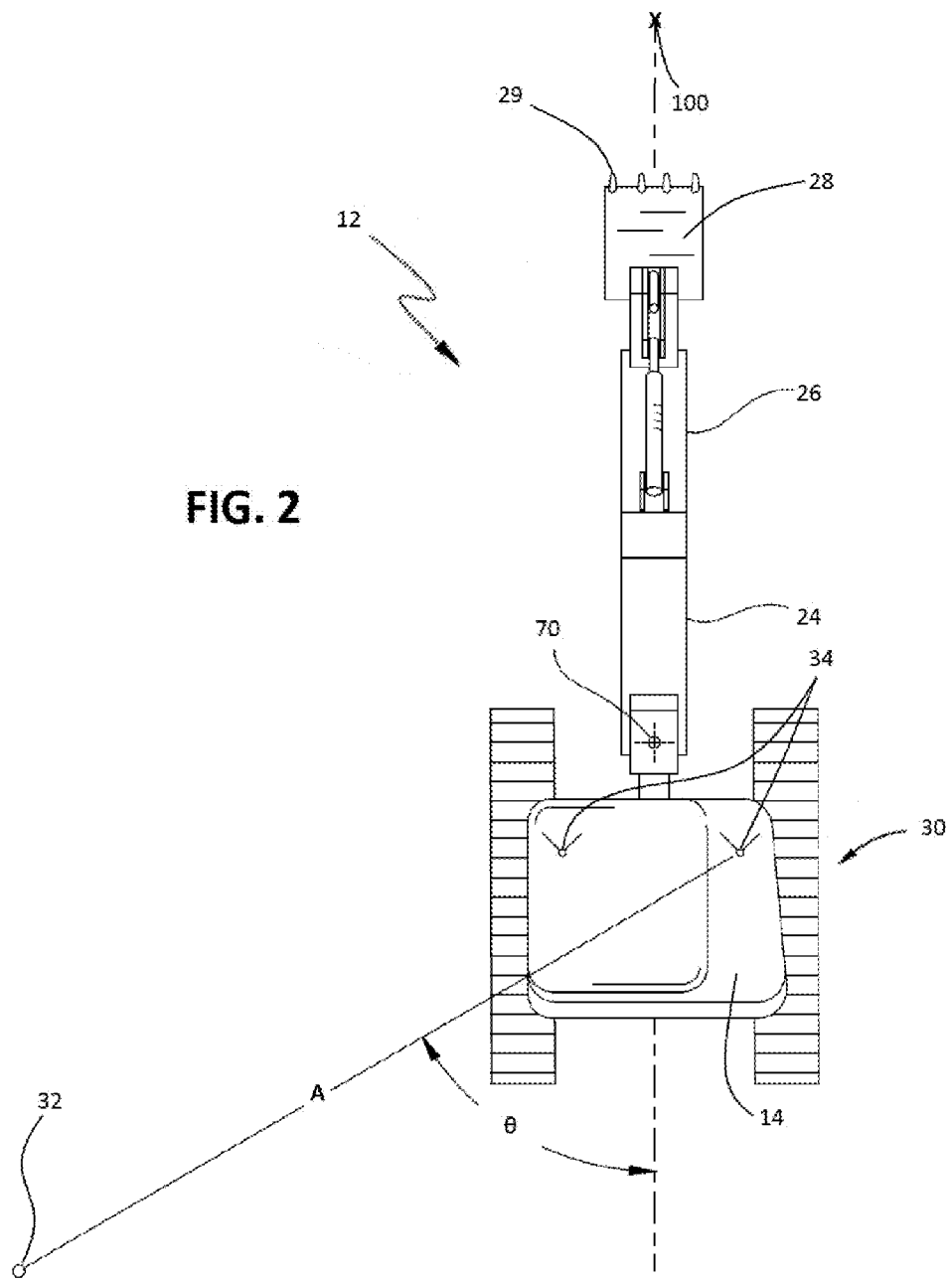

THREE DIMENSIONAL FEATURE LOCATION FROM AN EXCAVATOR

CROSS REFERENCE TO RELATED APPLICATION

This application is a continuation-in-part of U.S. patent application Ser. No. 11/925,075, filed Oct. 26, 2007, the disclosure of which is hereby expressly incorporated by reference herein in its entirety.

FIELD OF THE DISCLOSURE

The present disclosure relates to an earth excavating machine having a means of locating a position on the earth and/or beneath the surface of the earth and recording the same.

BACKGROUND OF THE DISCLOSURE

Excavation machines of various descriptions find application in the installation, removal, and repair of below and above ground utilities and structures. Typical below ground utilities include water mains, sewers, conduit for electrical and communications lines, electrical and communications lines installed without conduit, subway transit tunnels, water tunnels and the like.

Below ground installation of utilities such as electrical and communication lines removes the utility lines from the visual appearance of the landscape. The location of underground utilities is generally established in advance by design engineers and provided to persons installing the utilities in the form of drawings. Location includes not only the X-Y-axes location of the utility with respect to the surface of the earth, but also includes location on the Z-axis (e.g., the distance beneath the surface of the earth or possibly referenced to sea level). In practice, the actual location of underground utilities may deviate from the location described in preconstruction drawings because of interference below the surface of the earth resulting from rocks, or rock formation, trees, building foundations, or previously installed utilities unknown to the design engineers. In anticipation of the installation of additional below ground utilities and structures in the vicinity of a first structure, and in anticipation of possible repair or replacement of a first underground utility in a vicinity, and to prevent subsequent excavations from encountering unmarked sub-surface utility structures or sub-surface obstructions, engineers make a record of the location of the utility, as installed and possibly other sub-surface obstructions. Such locations are recorded on drawings known as "as-built drawings".

Typically, multiple parties are involved in the production of as-built drawings, which subjects the process to lengthy production schedules and potential human error. A first party may prepare initial or crude as-built drawings in the field. These initial drawings may consist of red-line notations on a copy of the design drawings, the location of the as-built utility having been established by hand measurements and surveying instruments, for example. A second party may then transfer the first party's initial drawings and notes into a computer aided design tool, such as the program AutoCad™ or similar computer aided design tools, to prepare the finished as-built drawings.

The instant invention finds utility with excavation machines including tracked excavators, wheel-based excavators, and tractor-based backhoes. It is known to determine the location of an excavator, or other machine for adjusting and moving surface and below surface earth by means of global positioning system (GPS) devices. The GPS device determines the location of its antenna. If the antenna is located on the machine, then the geographic location point of the machine may be determined by satellite triangulation.

Currently, the location of a feature on a job site requires location of the GPS antenna at that location. While the location of sub-surface "as-built" features on a job site may be found by locating GPS antennas at such features, such a task has limited advantages over hand measurements and surveying instruments. Notes of measurements and transfer of the as-built measurements to drawings remains a requirement. Typically, the as-built drawings will be a condition precedent to final payment to a builder or contractor by a utility company or municipality. Furthermore, GPS signals may be obstructed within a below ground level excavation, or by neighboring building structures or terrain.

"Offsets" provide a useful addition to GPS location information. An offset is the distance, direction, orientation, and depth (or height) of a feature determined with respect to the location of the GPS antenna. When the offset is combined with a GPS-determined location, the location of the feature can be identified in three coordinates (X, Y, and Z). Identification of two points on a target feature discloses the orientation of the feature as well as the location of the feature.

SUMMARY

According to an embodiment of the present disclosure, a work vehicle is provided for locating a topographic feature at a job site. The work vehicle includes a chassis and a tool moveably coupled to the chassis to move earth at the job site. The tool is configured to be positioned at the topographic feature. The work vehicle also includes a positioning system that communicates data related to the geographic location of the work vehicle. The work vehicle further includes a computing system that communicates with the positioning system to determine the geographic location of the tool, the computing system determining the geographic location of the topographic feature when the tool is positioned at the topographic feature.

According to another embodiment of the present disclosure, a work vehicle is provided for locating a topographic feature at a job site. The work vehicle includes a chassis and a tool moveably coupled to the chassis to move earth at the job site. The tool is configured to be positioned at the topographic feature. The work vehicle also includes a positioning system that communicates data related to the geographic location of the work vehicle and a computing system. The computing system has a memory with software. The software includes instructions that, when interpreted by the computing system, perform the steps of: determining an offset from the geographic location of the work vehicle to the tool; and combining the geographic location of the work vehicle and the offset to determine the geographic location of the topographic feature when the tool is positioned at the topographic feature.

According to yet another embodiment of the present disclosure, a method is provided for locating a topographic feature at a job site from a work vehicle. The work vehicle includes a chassis. The method includes the steps of moving a tool relative to the work vehicle to position the tool at the topographic feature and determining the geographic location of the tool when the tool is positioned at the topographic feature, the geographic location of the topographic feature corresponding to the geographic location of the tool.

BRIEF DESCRIPTION OF THE DRAWINGS

The above-mentioned and other features and advantages of this disclosure, and the manner of attaining them, will become more apparent and the invention itself will be better understood by reference to the following description of embodiments of the invention taken in conjunction with the accompanying drawings, wherein:

FIG. 2 is a top plan view of the excavator of FIG. 1, further depicting an offset from a reference station;

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION

The present disclosure concerns a combination of an identified topographic feature and an offset to an excavation machine.

A further embodiment of the disclosure concerns a further offset from the construction machine to a feature established by a laser range finder affixed to the excavator dipper arm.

A further embodiment of the disclosure concerns a further offset from construction machine to the feature established by pointing the tool at the feature.

A further embodiment of the disclosure concerns real time integration of the location of the feature into the data for preparation of as-built drawings.

A further embodiment of the disclosure concerns collection of data characteristic of topographic features.

A further embodiment of the disclosure concerns transmitting data characteristic of topographic features to a computer apart from the excavation machine.

A further embodiment of the disclosure concerns manipulation of data to characterize topographic and installation features in real time by an onboard computer.

Figure 1:
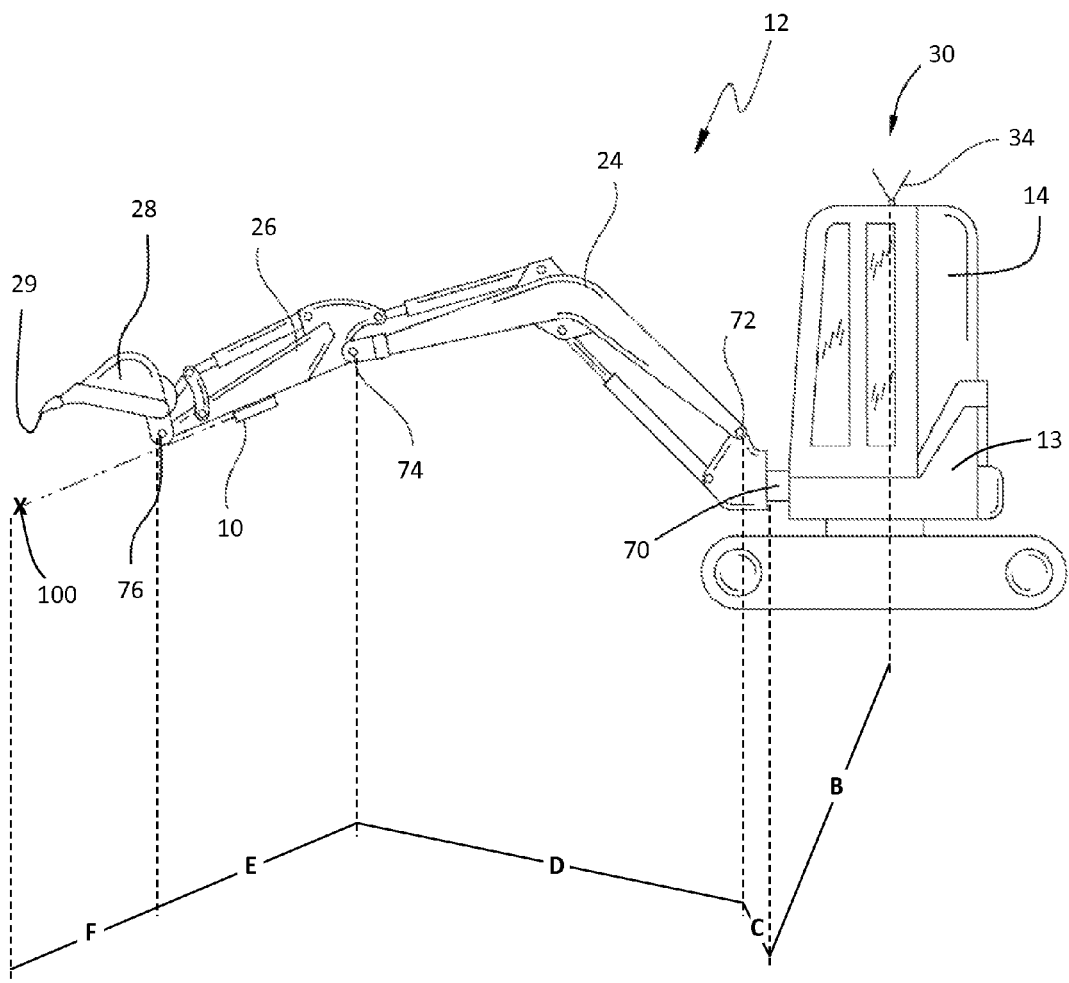
FIG. 1 is a side elevational view of an excavator equipped with a laser rangefinder.

With reference to FIG. 1, the present disclosure relates to an excavation machine 12, illustratively a tracked excavator. Excavation machine 12 may also include a wheel-based excavator, a tractor-based backhoe, and other machines for adjusting and moving surface and below-surface earth at a job site. As shown in FIG. 1, excavation machine 12 includes a tracked chassis 13, operator cab 14 supported by chassis 13, and a bucket 28 or another digging implement that is moveably coupled to chassis 13 for moving earth at the job site. Between chassis 13 and bucket 28, excavation machine 12 includes a first, boom arm 24 and a second, dipper arm 26.

Excavation machine 12 also includes an on-board computer 80 (FIG. 8) that is programmed to track and control the operation of excavation machine 12, as discussed below. Preferably the onboard computer 80 is an appropriately programmed general purpose computer, perhaps a laptop model. It is also within the scope of the present disclosure that computer 80 may be located off-board or apart from excavation machine 12.

As shown in FIG. 2, the geographic location of the excavation machine 12 on the earth can be determined by a global positioning system (GPS) device 30. Specifically, GPS device 30 determines the location of a receiving antenna 34, which is mounted at a known location on chassis 13 of excavation machine 12, via satellite transmissions from geosynchronous satellites. In this manner, the geographic location of antenna 34 corresponds to the geographic location point of excavation machine 12. When antenna 34 is located, GPS device 30 communicates data related to the geographic location point of excavation machine 12 to computer 80 (FIG. 8), which may be represented as three coordinates (X, Y, and Z). Suitable GPS systems affording centimeter-level accuracy are available from Trimble Navigation Limited, Sunnyvale Calif., United States.

The present disclosure contemplates excavation machine 12 having multiple GPS antennas 34, as shown in FIG. 2. In addition to determining the location of excavation machine 12, GPS device 30 of FIG. 2 may also determine the orientation of excavation machine 12 (e.g., angle θ of FIG. 2) and the direction that excavation machine 12 is facing by comparing the data received from antennas 34. Antennas 34 are illustratively positioned at top forward corners of operator cab 14 of excavation machine 12.

For improved accuracy, GPS device 30 may utilize a reference station 32 having a known geographic location, as shown in FIG. 2. In this embodiment, the geographic location point of excavation machine 12 would be determined by measuring a first, variable offset A between the known geographic location of reference station 32 and antenna 34 (which depends on the location of the excavation machine 12 on the excavation job site). Reference station 32 may be located away from the excavation job site (e.g., a "differential GPS" reference station located miles away from the excavation job site), or reference station 32 may be located at or near the excavation job site (e.g., a local positioning station). Signals may be transmitted between the reference station 32 and excavation machine 12 by laser or radio frequency communication rather than as satellite signals. A typical job-site positioning by laser reference station is provided by Topcon Laser Systems Inc., Pleasanton, Calif., United States. Accuracy is promoted as a few millimeters.

For some applications of the invention, determination of the relative location of a topographic feature 100 on the job site is sufficient. The geographic location of the topographic feature 100 on the earth is not warranted, or required. In such instances, the GPS device 30 may be omitted, and the topographic feature 100 may be located with respect to a local job-site reference station 32 or a benchmark surveyed independently of activity related to the excavation job site.

The foregoing systems accurately determine the geographic location point of excavation machine 12 (i.e., the geographic location of antenna 34). What has heretofore not been provided is a means of locating topographic features 100, including features on, above, or below the surface of the earth, from the operator cab 14 of the excavation machine 12.

Excavation machine 12 of the present disclosure further includes means for inputting workspace data, means for storing workspace data, means for displaying workspace data, means for interacting with and manipulating workspace data, and means for outputting workspace data. The workspace data may include geographic workspace information obtained from drawings or files of the job site that are constructed via measurements taken by hand, by GPS, or otherwise. Such geographic workspace information includes information regarding the placement of above-surface and sub-surface features at the job site near excavation machine 12, including utility lines. Such drawings can be formatted according to any number of known formats, including popular AutoCad™ formats.

Figure 8:
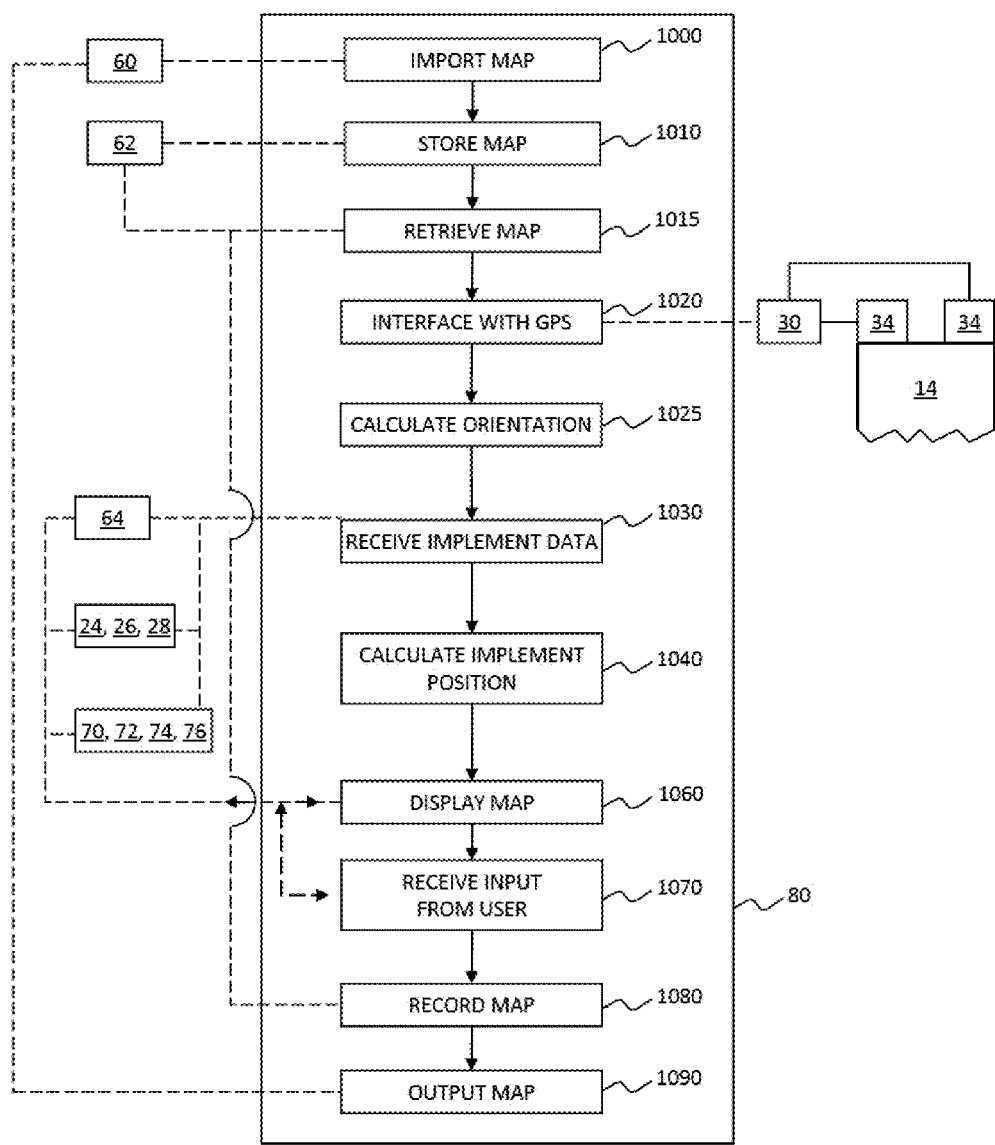
FIG. 8 illustrates interaction of data structures running on a computer of the excavator of FIG. 7.

As shown in FIG. 8, the means for inputting workspace data include any communication device that allows for workspace data to be provided to computer 80 of excavation machine 12. In the present example, a USB port 60 capable of receiving a flash drive having workspace data files thereon is provided as the means for inputting. Additionally or alternatively, the means for inputting is simply a keyboard that allows a user to type in workspace data. In yet another alternative, the means for inputting may also include a wireless link or a cellular telephone modem with the ability to download or otherwise receive data.

Excavation machine 12 then stores the data, such as in non-volatile memory 62, as shown in FIG. 8. Excavation machine 12 also provides the data to display 64, as shown in FIGS. 3A-3D. Display 64 is illustratively provided as a simple flat screen display tablet in operator cab 14 (FIGS. 1 and 2). However, embodiments are envisioned where display 64 is a heads-up style display where images are projected or otherwise displayed on the windows of operator cab 14. As discussed further below, the programming of computer 80 includes software that can interpret the received and stored workspace data to provide a visual representation approximating a map of the job site. Such a map includes the locations of various underground elements indicated by the received workspace data. Options are provided that allow aerial/satellite maps, such as those obtained from Google Maps or otherwise, to be combined with the workspace data so that a user can more easily correlate map positions with real-world topology of the job site.

The means for interacting includes software on computer 80 of excavation machine 12 that receives and integrates information regarding the geographic location of excavation machine 12 with the received and stored workspace data. In an exemplary embodiment, the software outputs the interaction visually onto display 64. For example, the software may display, in real-time, an icon of excavation machine 12 on the map of display 64 at the appropriate geographic location point of excavation machine 12. The geographic location of excavation machine 12 is combined with the stored map to provide a real-time, interactive representation of the job site in which excavation machine 12 is located. Such mapping informs the user by providing a visual contextual rendering of excavation machine 12 at the job site and of topographic features 100 at the job-site, as shown in FIGS. 3A-3D. Still further, the location of implements, such as boom arm 24, dipper arm 26, and bucket 28 may be shown on display 64 in real-time. Additionally, information such as a semi-circular arc 66 defining the maximum reach of bucket 28 of excavation machine 12 may be depicted on display 64 in real-time, as shown in FIG. 3C.

Additionally, the software may receive and integrate information regarding the geographic location and other characteristics of topographic feature 100 with the received and stored workspace data. In an exemplary embodiment, the software outputs the interaction visually onto display 64 and is able to receive inputs from an operator using computer 80 in operator cab 14. For example, such interacting may take the form of recording the geographic location of feature 100 in non-volatile memory 62. Such interacting may also involve marking the geographic location of feature 100 on the map on display 64, such as by selecting a representative symbol or image from a menu on display 64. Such interacting may further involve confirming or correcting the actual or pre-planned geographic location of feature 100, such as by editing initial design drawings. Additionally, such interacting may take the form of recording a description of feature 100 in non-volatile memory 62. The complete record of the identity of the feature 100 and precise measurements of the location of the feature 100 are thereby recorded in computer 80 in the form of as-built drawings.

The means for outputting include any communication device that allows for workspace data to be downloaded and delivered from computer 80 of excavation machine 12. In the present example, the USB port 60 is provided as the means for outputting, as well as the means for inputting. Alternatively, the means for outputting is a wireless link or a cellular telephone modem with the ability to transmit data. After feature 100 is properly recorded in computer 80, excavation machine 12 may output the edited workspace data to another computer (not shown), such as the computer of the project manager or the customer for billing. The outputted workspace data may be in the form of finalized as-built drawings, as-built drawings requiring consolidation or further editing, or raw data that has yet to be incorporated into as-built drawings.

As previously noted with respect to FIGS. 1 and 2, the location of GPS antenna 34 on excavation machine 12 is known to the programmers of the software onboard excavation machine 12 or is input by a user. This location of antenna 34 may be measured as having a first offset A from reference station 32. Similarly, the relative offsets between antenna 34 and other parts of excavation machine 12 are also known or determined by the software. An offset is the distance, direction, orientation, and depth (or height) of a geographic feature 100 or machine part determined with respect to the location of antenna 34 or another location on excavation machine 12. When the offsets are combined with the GPS-determined geographic location point of excavation machine 12 (i.e., the geographic location of antenna 34), the geographic location point of the feature 100 or machine part can be identified in three coordinates (X, Y, and Z).

Figure 4:
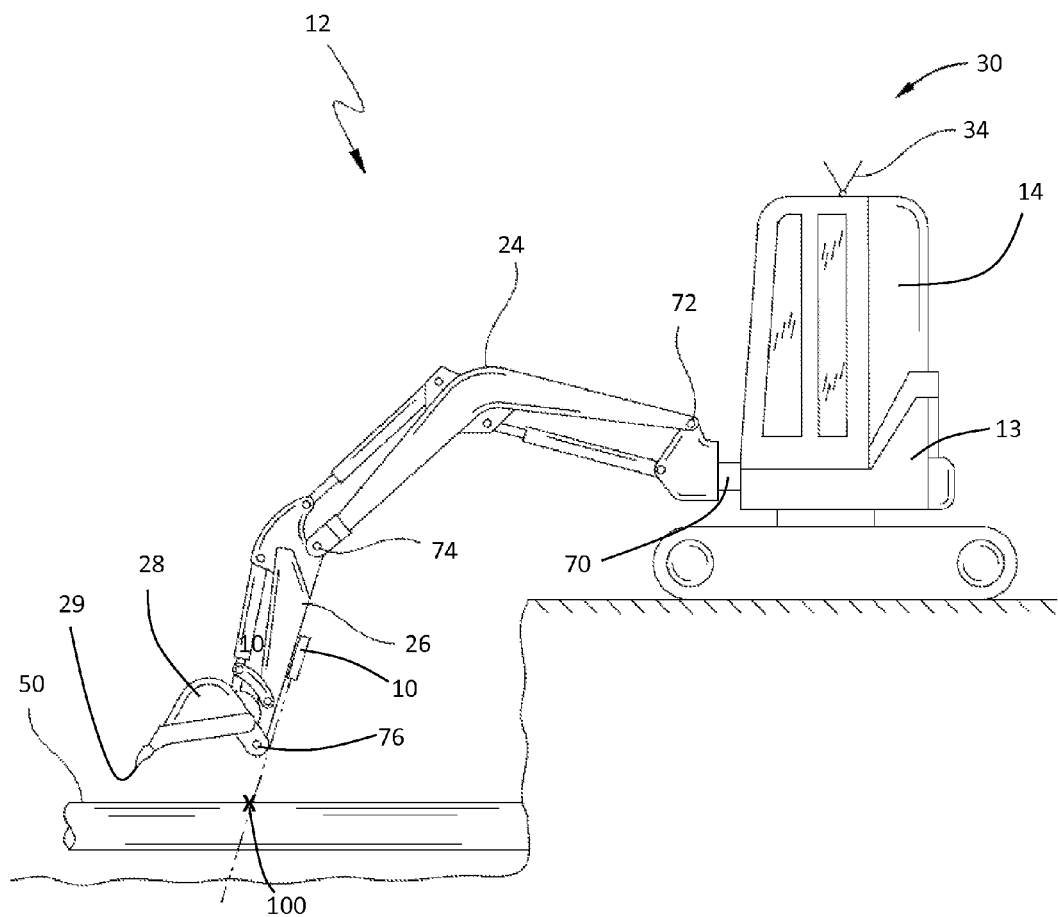
FIG. 4 is a side elevational view of the excavator of FIG. 1 locating a sub-surface obstruction with the laser rangefinder.

In a first exemplary embodiment of the present disclosure, and as shown in FIG. 4, excavation machine 12 includes a laser-type rangefinder 10. Illustratively, laser rangefinder 10 is mounted on dipper arm 26 of excavation machine 12. Laser-type rangefinders 10 that may be useful for enabling the instant invention include products of Laser Technology, Inc., Centennial, Colo. 80112, and Schmitt Measurement Systems, Inc., Portland Oreg. 97210, both of the United States.

Computer 80 (FIG. 8) locates laser rangefinder 10 by evaluating the relative offsets between antenna 34 and laser rangefinder 10. A list of relevant offsets include: a second, fixed offset B between antenna 34 and swing-pin 70; a third, variable offset C between the swing-pin 70 and boom pin 72; a fourth, variable offset D between boom pin 72 and dipper pin 74 (which depends on the length and angle and direction of boom arm 24); and a fifth, variable offset E between dipper pin 74 and the laser rangefinder 10 (which depends on the mount position of laser rangefinder 10 and the angle of dipper arm 26). Fixed parameters may be known by the software onboard excavation machine 12, either by being preset or being input by a user. Such fixed parameters may include, for example, the distance between antenna 34 and swing-pin 70, the length of boom arm 24, and the mount position of laser rangefinder 10 on dipper arm 26.

To establish the offsets from the swing-pin 70 to the laser rangefinder 10, several axes of rotation and optionally a linear extension in the form of the variable extension on dipper arm 26 are encountered. Suitable sensors positioned at each articulation point may be used to detect movement of excavation machine 12.

The first axis of rotation is swing-pin 70. The table of excavation machine 12 may rotate about swing-pin 70, or in the case of a tractor-mounted backhoe, boom arm 24 may rotate about swing-pin 70. In the case of an excavator operable with a rotating table, it may not be equipped with an actual 'swing-pin', nonetheless, for purposes of the description herein, such rotating table-type excavators will be discussed as if a swing-pin were present. For rotating table-type excavators, the orientation of boom arm 24 corresponds to the orientation of chassis 13 (e.g., angle θ of FIG. 2). As discussed above, GPS device 30 may be capable of determining the orientation of chassis 13, such as by using multiple antennas 34 on chassis 13. For excavators equipped with an actual swing-pin 70, where the orientation of boom arm 24 varies relative to chassis 13, a rotary encoder at swing-pin 70 may be used at swing-pin 70 to provide data to computer 80 and to determine the direction of boom arm 24.

Other axes of rotation include boom pin 72 (which enables rotation of boom arm 24) and dipper pin 74 (which enables rotation of dipper arm 26). The radial orientation of each axis 70, 72, 74 may be measured by a rotary encoder that is positioned to detect movement about each axis 70, 72, 74. When combined with algorithms appropriate for the individual excavation machine 12, computer 80 can determine the orientation of the boom arm 24, the orientation of the dipper arm 26, and the distance between laser rangefinder 10 and swing-pin (actual or virtual) 70.

For excavation machines 12 equipped with a dipper extension (not shown), a linear encoder and appropriate algorithm provide computer 80 with the additional data required to calculate the position of laser rangefinder 10.

The working environment of excavators may include uneven terrain. Chassis 13 of excavation machine 12 may be oriented such that the pitch and roll of excavation machine 12 deviates from horizontal and vertical. Pitch and roll measurements may be determined by noting the difference in location of multiple antennas 34 mounted on the operator cab 14 or elsewhere on chassis 13. It is also within the scope of the present disclosure that pitch and roll measurements may be determined by inclinometers or other sensors oriented orthogonally and mounted on the operator cab 14 or elsewhere on chassis 13. As a result, computer 80 may also determine the pitch and roll of boom arm 24, dipper arm 26, and laser rangefinder 10 through axes of rotation 70, 72, 74.

In use, the operator may collect real time data of the geographic location of a feature 100 by orienting the dipper arm 26 in the direction of the feature 100 to be measured and illuminating the feature 100 with the laser rangefinder 10. In essence, computer 80 determines a sixth, variable offset F between laser rangefinder 10 and the illuminated feature 100. To enhance daylight visibility to the operator of the laser illumination, the signal may be enhanced by a second light color such as white or green light. Further enhancement of visibility may optionally be provided by a pattern of a second light color, such as cross-hair.

In an alternative embodiment, the laser rangefinder 10 may be mounted in alternative position to the dipper arm 26 of the excavation machine 12. A suitable position would be on the chassis 13 of the excavation machine 12 adjacent to the operator cab 14, but the embodiment is not so limited. Preferably the mounting would provide gimbal movement which would permit sighting the laser rangefinder 10 to the illumination target. When coupled with a rotary encoder, the laser rangefinder 10 may be directed to a target and illuminate the feature 100 independent of movement of the boom arm 24, dipper arm 26, or segments thereof. Appropriate offsets from the location of the laser rangefinder 10 and algorithms therefore would be programmed in computer 80 as in the above-discussed embodiment with the laser rangefinder 10 situated on the dipper arm 26. Data related to the sighting direction of the laser rangefinder 10 with respect to the antenna 34 would be provided to computer 80 by rotary encoders on the gimbal mount, which gimbal mount is rigidly connection to the excavator chassis 13.

Suitable laser rangefinders 10 then transmit the distance (i.e., the sixth offset F) from the laser rangefinder 10 to the illuminated feature 100 to the programmed computer 80. Data communication between the laser rangefinder 10 and computer 80 may be hardwired, or by means of a personal area network communication such as "Bluetooth".

Upon receipt of input data from the laser rangefinder 10, computer 80 collects signals from the rotary encoders, the linear encoder if so equipped, and the GPS device 30. In embodiments having the laser rangefinder 10 mounted on the dipper arm 26, the length of the dipper arm 26 from the dipper axis 74 to the laser rangefinder 10 is essentially arithmetically extended to the illuminated feature 100. The three-dimensional location of the illuminated feature 100 is calculated by combining the offsets B-F with the geographic location point of the excavation machine 12 (i.e., the geographic location of antenna 34) by arithmetic translation and rotation along the linkages using measurements from the aforementioned linear and rotary encoders. When the orientation of the excavation machine 12 deviates from horizontal, then appropriate adjustments of the location for pitch and roll made to the data for determination of the three-dimensional location of the illuminated feature 100.

Computer 80 may calculate the three-dimensional coordinates of the feature 100 by means of the algorithms programmed for the offsets, the laser rangefinder 10 data, and the job-site positioning data. Or optionally, the raw data may be downloaded for subsequent calculation of the feature 100 location and preparation of as-built drawings, or transmitted to another remote computer (not shown) apart from the excavation machine 12, possibly by recorded media, such as a memory chip, magnetic disk, or wireless means such as a cellular telephone modem for manipulation.

FIG. 4 shows a located sub-surface feature 100 in an excavation, illustratively a point on a water main 50. Computer 80 may then provide the operator the opportunity to identify the feature 100 by appropriate description or notation, for example: "buried electrical cable" or, in the illustrated embodiment, "ten inch water main." The as-built drawing may be edited directly by the operator onboard the excavator by modifying the initial engineering design drawing using computer 80 and display 64 provided.

Figure 5:
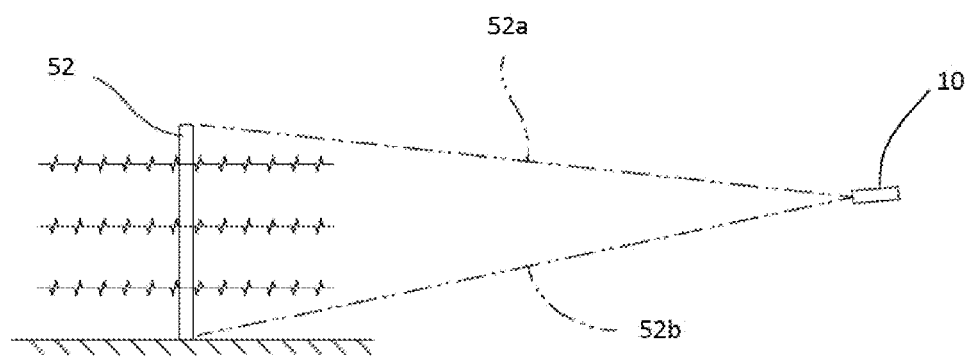
FIG. 5 illustrates location of an above-ground fence post with the laser rangefinder.

The utility of the onboard measurement is not limited to the location of sub-surface features 100 as heretofore described. As illustrated in FIG. 5, above-ground features 100, illustratively fence post 52, may also be measured by illumination of the structure, such as the top 52a and bottom 52b of a fence post 52. The operator illuminates the top 52a and bottom 52b the fence post 52 and initiates data collection by computer 80 for each illumination 52a, 52b. Advantageously, the operator also inputs a notation associated with data collected by computer 80 from the illumination that identifies the data as that of a particular fence post 52. The notation input may be by voice collected by computer 80 by an appropriate microphone, or the notation may be made by traditional key board and mouse user interface, or both. The collected data upon manipulation by computer 80 suitably programmed generates the location and height of a fence post 52. The fence post may then be incorporated as a feature and appropriately located, with its associated height, on as-built drawings. If computer 80 is programmed to generate as-built drawings in addition to collecting data therefore, the operator is then afforded the opportunity to see on the display 64 that the feature registers appropriately on the drawings.

Figure 6:
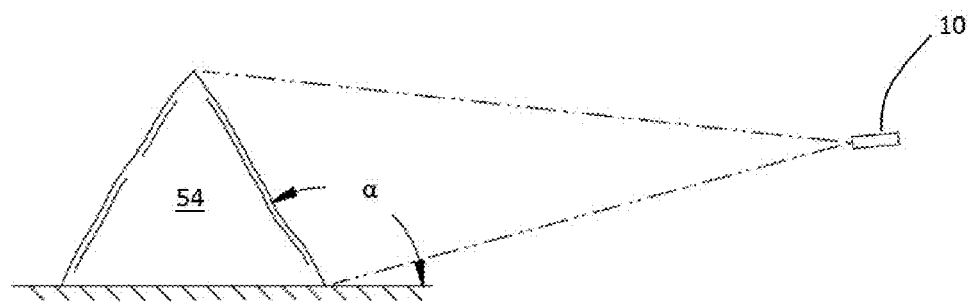
FIG. 6 illustrates location of a pile of manufactured material for volume measurement with the laser rangefinder.

A further useful feature is illustrated by FIG. 6. When combined with the common formula for the volume of a right circular cone: $V=(\pi r^2 h)/3$, the altitude of a processed construction material is readily determined, as is the radius either from the angle α of intersection of the cone with a horizontal surface, or the difference of horizontal vectors of the laser illuminated measurements. The excavator operator then may conveniently measure the volume of a cone shaped stockpile 54 such as mined gravel, coal, or grain. The convenience of such a useful feature would enable the operator to collect data to determine a volume of material. It would therefore not be necessary for a separate survey of the stockpile 54 to determine its volume.

The volume of the stockpile 54 thus determined may be recorded in computer 80, or recorded and transmitted to a central location via modem, where an appropriate charge for the stockpile 54 may be made to a customer by a central billing office. With the benefit of transmitted data, immediate and accurate data of a volume of a stockpile 54 delivered, appropriate invoicing of a customer, and cash flow of the vendor may be accelerated. Alternatively, computer 80 may be programmed to manipulate the data collected in a useful form and display the results to the operator. The resulting stockpile 54 volume information could be reported to a customer on site.

In summary, from the combination of the offset A between reference station 32 and the geographic location point of excavation machine 12 (i.e., the geographic location of antenna 34), the offsets B-E between the geographic location point of excavation machine 12 and laser rangefinder 10, and the offset F between the laser rangefinder 10 and the illuminated feature 100, the geographic location of the illuminated feature 100 may be determined with respect to the reference station 32. The geographic location of the illuminated feature 100 may also be used to determine characteristics of the feature 100 (e.g., features on, above, or below the surface of the earth) from the operator cab 14 of an excavation machine 12. As the reference station 32 may be discontinued, and its original location becomes lost, by incorporating GPS data, the geographic location of the feature 100 may be stated and recorded with respect to the earth itself.

Figure 7:
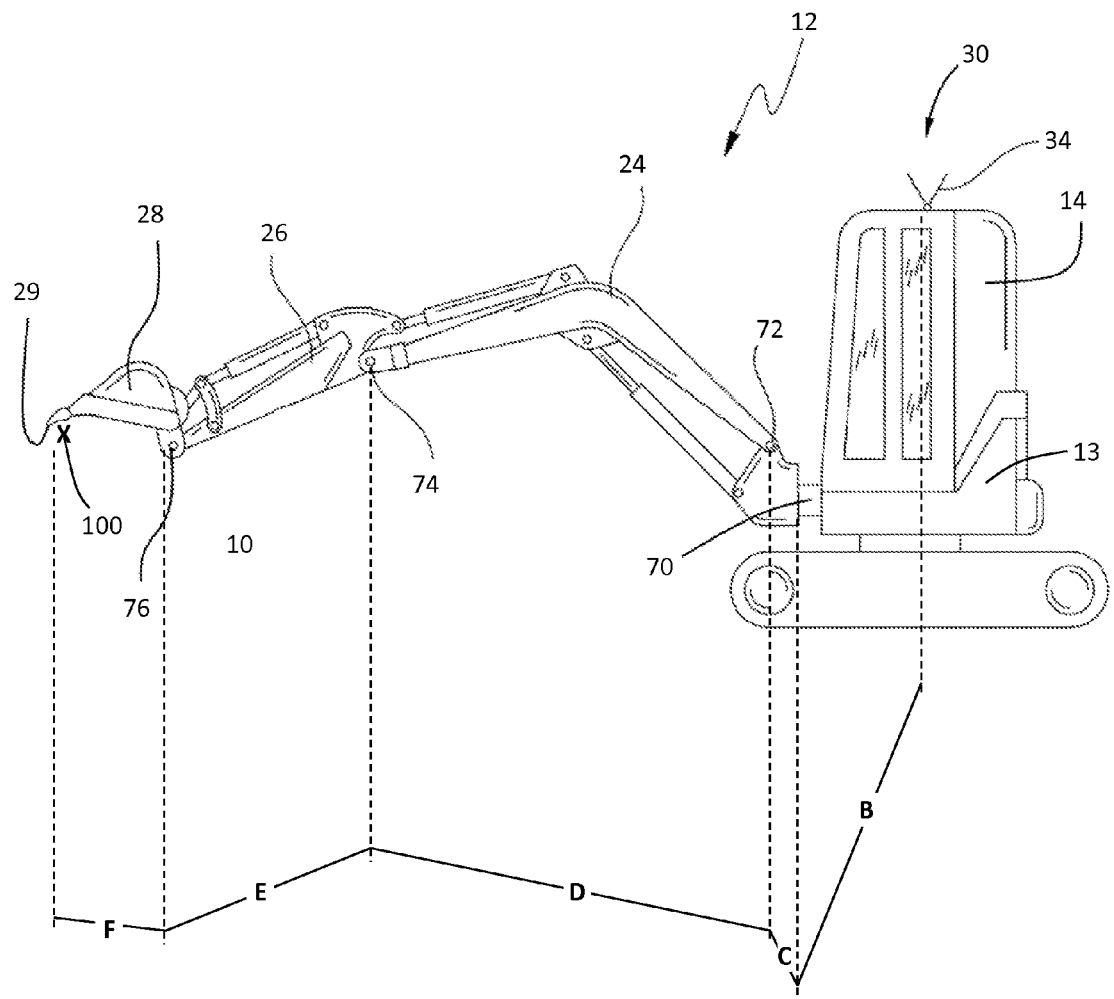
FIG. 7 is a side elevational view of another excavator of the present disclosure, the excavator having a bucket configured for use as a pointing tool.

In a second exemplary embodiment of the present disclosure, and as shown in FIG. 7, bucket 28 of excavation machine 12 is used to locate feature 100. Specifically, tooth tip 29 of bucket 28 is used to locate feature 100. In this second embodiment, excavation machine 12 need not include a laser rangefinder 10 (FIG. 4).

Computer 80 evaluates offsets between tooth tip 29 of bucket 28 and antenna 34. A list of relevant offsets include: a second, fixed offset B between antenna 34 and swing-pin 70; a third, variable offset C between swing-pin 70 and boom pin 72; a fourth, variable offset D between boom pin 72 and dipper pin 74 (which depends on the length and angle and direction of boom arm 24); a fifth, variable offset E between dipper pin 74 and bucket pin 76 (which depends on the length and angle of dipper arm 26); and a sixth, variable offset F between bucket pin 76 and tooth tip 29 (which depends on the length and angle of bucket 28). Again, fixed parameters may be known by the software onboard excavation machine 12, either by being preset or being input by a user. Such fixed parameters may include, for example, the distance between antenna 34 and swing-pin 70, the length of boom arm 24, and the length of bucket 28.

It should be appreciated that excavation machine 12 can take on different buckets 28, or other implements, each having different sizes and shapes, thus producing different offsets associated therewith. Accordingly, the identity of bucket 28 is also provided to computer 80. While the raw measurement data of bucket 28 can be provided to computer 80, the computer 80 may also have pre-stored configuration files that provide the offset data for various common buckets. Different buckets 28 can be identified to the computer 80 via user entry, or through an automated means, such as an RFID reader located near the end of dipper arm 26 (and in communication with the computer 80) and a RFID tag located on bucket 28.

In use, the operator of excavation machine 12 places tooth tip 29 of bucket 28 as close as possible to feature 100. In other words, the operator uses tooth tip 29 of bucket 28 as a pointer to identify and locate feature 100. Skilled operators may be able to place tooth tip 29 within 2 inches, 1.5 inch, 1 inch, 0.5 inch, or less of feature 100 without actually having to contact feature 100, all of which are within an acceptable as-built drawing tolerance of about 4 inches, for example. When tooth tip 29 is located near feature 100 (which may be confirmed by pressing a "start" button or another user input), computer 80 collects signals from the rotary encoders, the linear encoder if so equipped, and the GPS device 30. The computer 80 uses this collected information to calculate the offsets B-F between the tooth tip 29 and the geographic location point of the excavation machine 12 (i.e., the geographic location of antenna 34) and to determine the geographic location point of the feature 100 near the tooth tip 29. It is within the scope of the present disclosure that the computer 80 may add a nominal value to sixth, variable offset F between bucket pin 76 and tooth tip 29 to account for the fact that tooth tip 29 may not directly contact feature 100.

The display 64 of FIGS. 3A-3D is illustratively a touch-screen that includes a plurality of buttons. Such buttons include informational buttons 67 that give context to what is being viewed. Examples of informational buttons 67 are ones that indicate whether a worksite is being shown, a workspace is being shown, or a side view is being shown on display 64. When a worksite is shown, as in FIG. 3A, the north side of the map may be oriented upward on display 64. By contrast, when a workspace is shown, as in FIGS. 3B and 3C, a zoomed in, more local map may be displayed from the perspective of the operator in cab 14. When a side view is shown, as in FIG. 3D, the position of bucket 28 may be shown in real-time relative to chassis 13 of excavation machine 12. Display 64 may also depict a target trench T, as well as communicate the current distance between bucket 28 and the grade line G and the current distance between bucket 28 and benchmark line B.

The buttons on display 64 may also include command or input buttons 68 that allow the user to alter display 64 and perform various tasks. Command buttons 68 may be organized in customizable menus for ease of use, as set forth below.

Figure 3A:
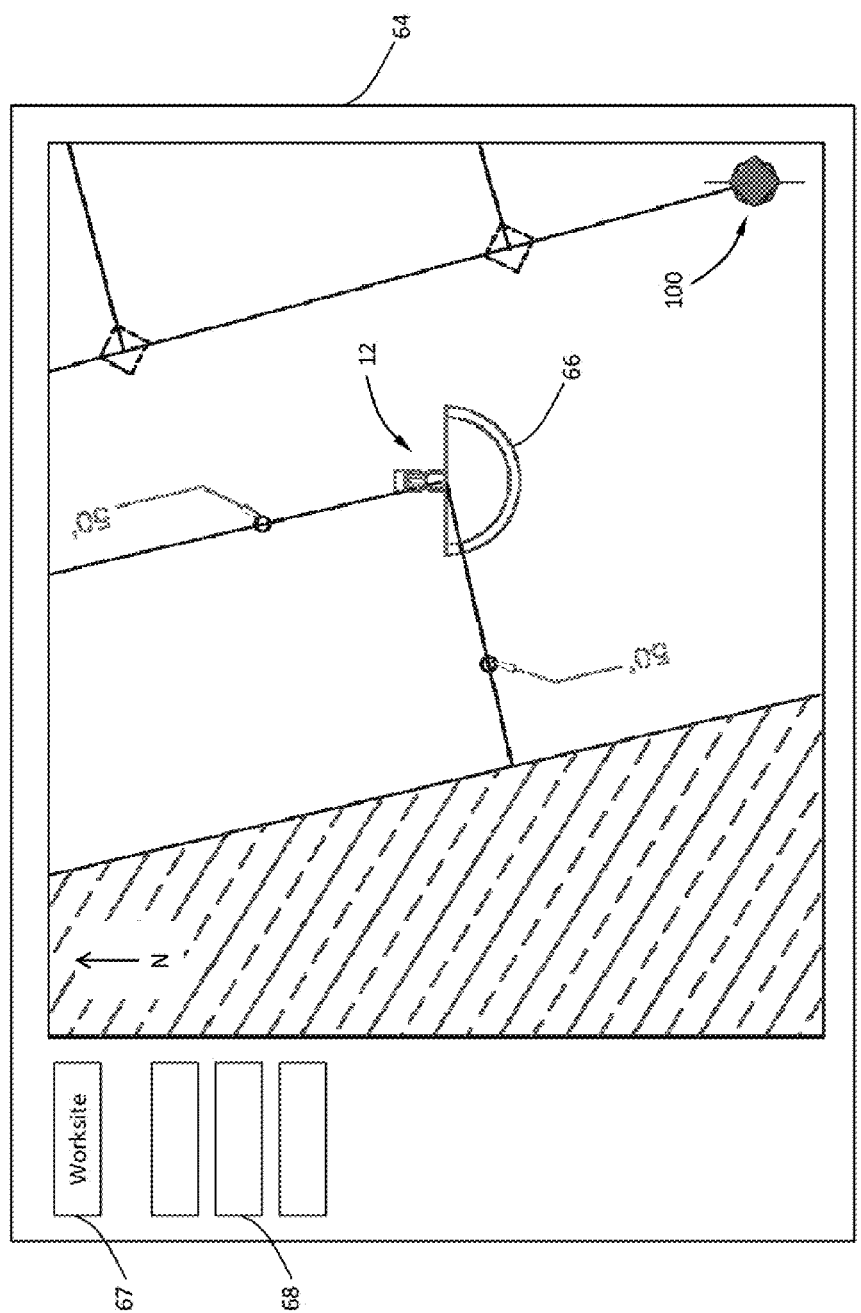
FIG. 3A is a schematic view of a display of the present disclosure shown in a worksite mode.

When informational button 67 indicates that a worksite is being shown, as in FIG. 3A, the user may select one or more of the following command buttons 68: "zoom," "pan," and "select scene," for example. The "zoom" button allows the user to zoom in or out of the map. The "pan" button allows the user to translate the map across display 64. The "select scene" button allows the user to customize the map view, such as by layering in aerial/satellite views, elevational views, grid lines, utility lines, or other scenes, for example.

In the worksite view, the user may also select one or more of the following command buttons 68: "dig" and "segment complete," for example. The "dig" button allows the user to specify or define a custom trench for digging (e.g., a target start location, a target depth, a target slope). After inputting the appropriate data, computer 80 may automatically generate a target, phantom icon of excavation machine 12 at the target start location. In use, the operator may drive excavation machine 12 until the actual icon of excavation machine 12 overlaps the target icon of excavation machine 12. It is also within the scope of the present disclosure that steering of excavation machine 12 may be performed automatically to drive excavation machine 12 to the target start location. After digging the custom trench, the user presses the "segment complete" button, which automatically records the completed trench and inputs the completed trench into the as-built drawings. The user may also assign a color to the completed trench corresponding to the anticipated use of the completed trench.

Figure 3B:
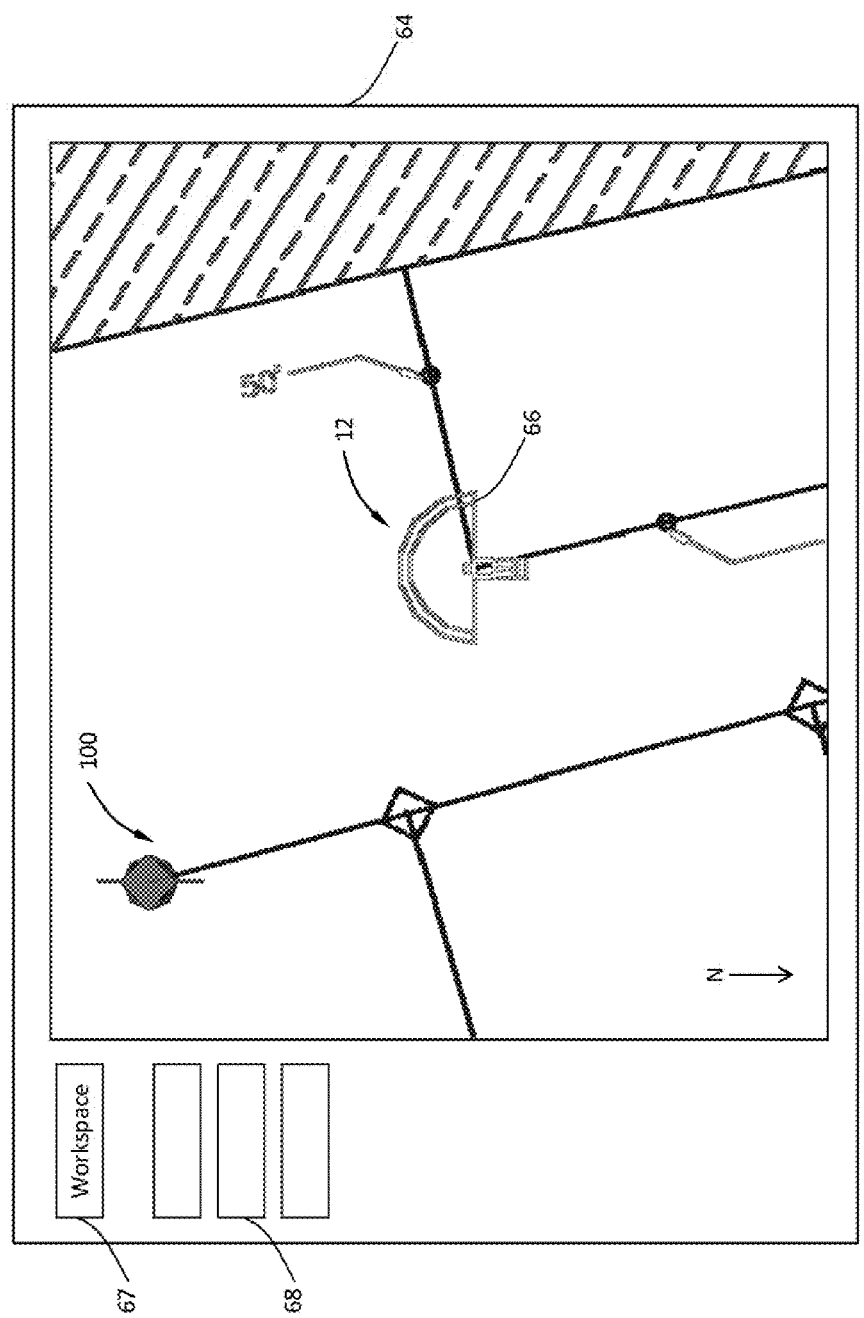
FIG. 3B is a schematic view of the display shown in a workspace mode.
Figure 3C:
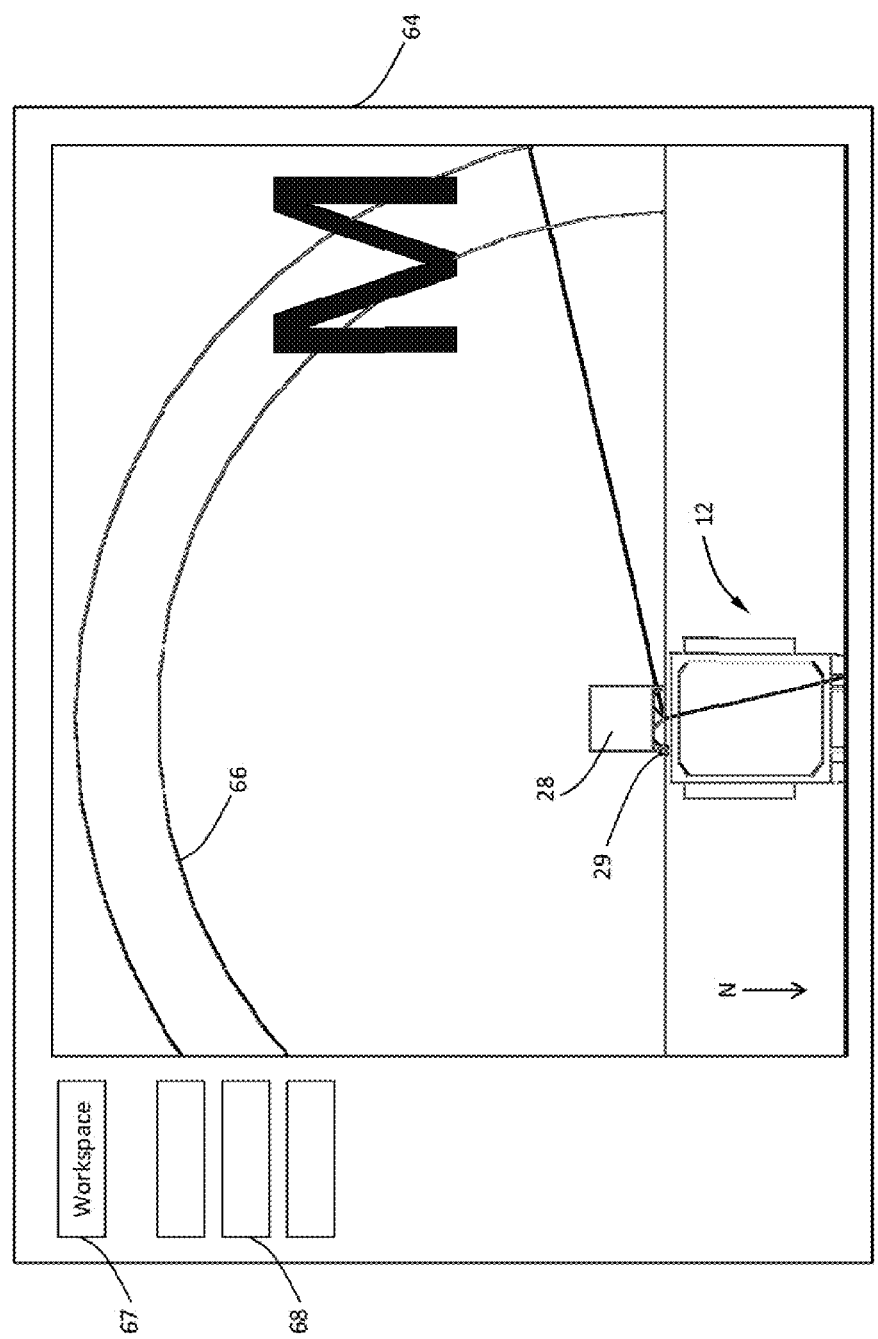
FIG. 3C is another schematic view of the display shown in the workspace mode.

When informational button 67 indicates that a workspace is being shown, as in FIGS. 3B and 3C, the user may select one or more of the following command buttons 68: "zoom," "select scene," "tool tip left/right," and "measure." The "zoom" and "select scene" buttons may have the same function as in the worksite mode. The "tool tip left/right" button allows the user to specify which tooth tip 29 of bucket 28 (e.g., the left-most tooth tip 29 or the right-most tooth tip 29) will be used for pointing. In this manner, the user can avoid pointing with the hidden, central portion of bucket 28 and can instead point with an exposed, side portion of bucket 28. Computer 80 will compute the offset to the selected tooth tip 29 of bucket 28 to properly locate feature 100 relative to the selected tooth tip 29. The selected tooth tip 29 may be highlighted or circled on display 64 to remind the user of the active tooth tip 29. In the illustrated embodiment of FIG. 3C, for example, the left-side tooth tip 29 is active and circled on display 64. The "measure" button allows the user to specify a desired measurement (e.g., length, slope, area, volume) and corresponding input points for measuring by computer 80. Returning to FIG. 5, for example, the user may point to top 52a of fence post 52 and to bottom 52b of fence post 52 and then request a length measurement of fence post 52 between top 52a and bottom 52b. As another example, the user may point to multiple vertices of a closed polygon and then request an area measurement for the space defined between the vertices.

In the workspace view, the user may also select a "modify" button, which allows the user to locate, add, and edit features on the map of display 64. The "modify" button may allow the user to add a new feature 100 to the map by pointing to the new feature 100 with bucket 28. When adding a new feature 100, display 64 may automatically generate a menu of symbols or images to label the new feature 100 on the map. For example, the user may select an octagon-shaped symbol when pointing to the location of a manhole, a square-shaped symbol when pointing to the location of an enclosure, a star-shaped symbol when pointing to the location of a power pole, and a circled-M symbol when pointing to the location of a gas meter. Other symbols and features are within the scope of the present disclosure. The "modify" button may allow the user to move, edit, or delete mapped features 100. In this manner, the operator is able to prepare and edit as-built drawings from operator cab 14 of excavation machine 12 during the excavation process.

Figure 3D:
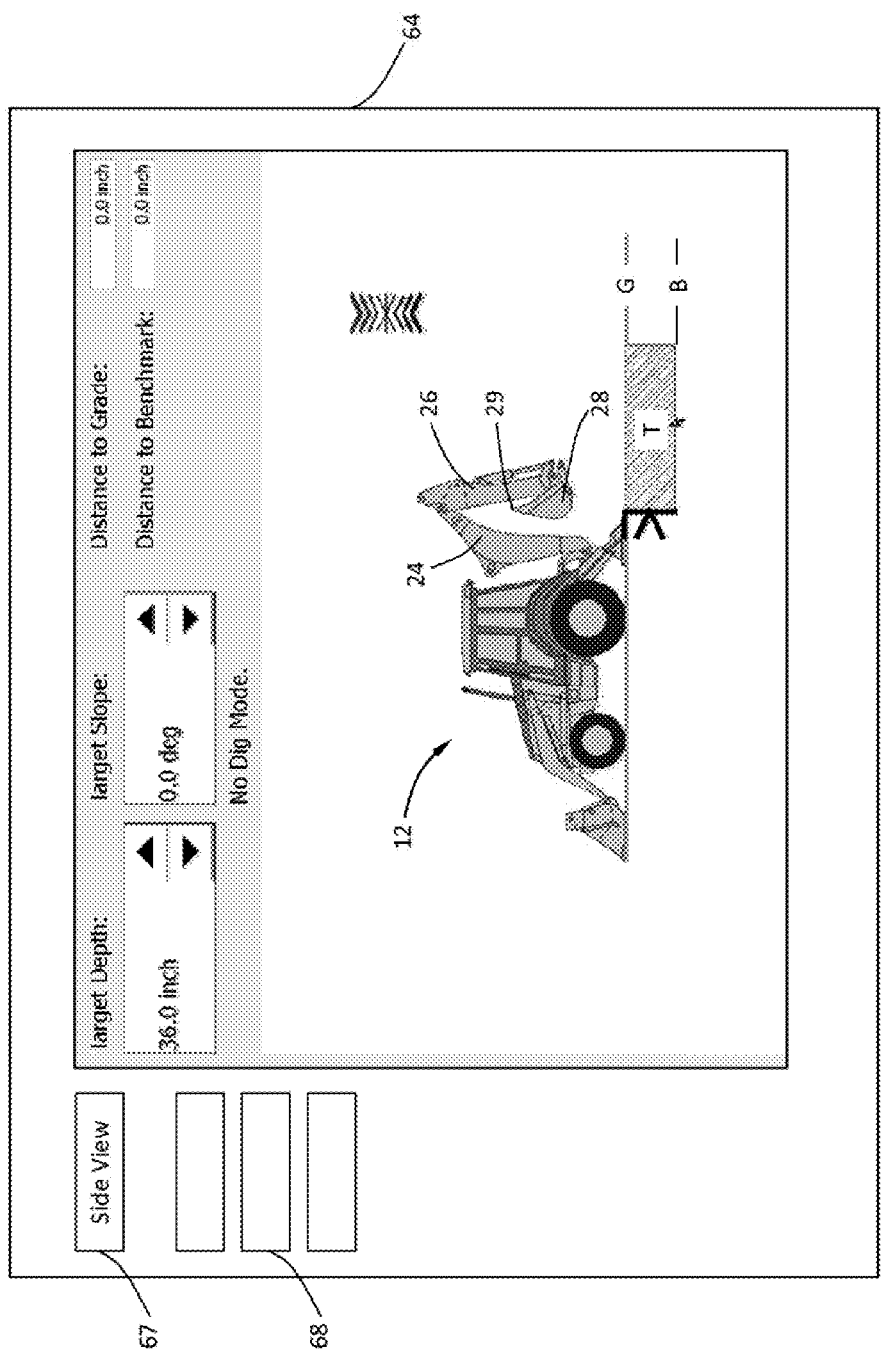
FIG. 3D is a schematic view of the display shown in a side view mode.

When informational button 67 indicates that a side view is being shown, as in FIG. 3D, the user may select one or more of the following command buttons 68: "tool tip left/right," "set benchmark," and "calibrate." The "tool tip left/right" button may have the same function as in the workspace mode. The "calibrate" button may allow the user to specify certain settings and measurements, such as the dimensions of bucket 28. The "set benchmark" button may allow the user to define a custom trench T for digging, such as by inputting the target depth and the target slope of the trench T. During the digging process, the user may refer to the side view of FIG. 3D to ensure that bucket 28 is reaching the desired depth. It is also within the scope of the present disclosure that computer 80 may automatically manipulate boom arm 24, dipper arm 26, and bucket 28 to dig the desired trench T.

The display 64 may also show exclusion zones around buried utility lines, as discussed in U.S. patent application Ser. No. 13/214,869, entitled "Buried Utility Data with Exclusion Zones," filed Aug. 22, 2011, the disclosure of which is hereby expressly incorporated by reference herein in its entirety.

With reference to FIG. 8, the software running on computer 80 includes a plurality of data structures. Such data structures include data structures for importing map data 1000, for storing map data 1010, for retrieving map data 1015, for interfacing with a GPS device 1020, for calculating machine orientation 1025, for receiving implement relative positioning data 1030, for calculating implement absolute positioning data 1040, for implementing exclusion zones 1050, for displaying map and positioning data 1060, for receiving user input 1070, for recording map and positioning data 1080, and for outputting map data 1090.

The data structure for importing map data 1000 interfaces with USB port 60 (or other similar interface) to obtain map data. This data is passed to the data structure for storing map data 1010. The data structure for storing map data 1010 interfaces with memory 62 to store the map data. The data structure for retrieving map data 1015 interfaces with memory 62 to retrieve previously stored map data. The data structure for interfacing with a GPS device 1020 communicates with GPS device 30 (which includes the plurality of antennas 34) to obtain GPS coordinates for antennas 34. The data structure for calculating machine orientation 1025 takes the obtained GPS coordinates and determines the position of excavation machine 12 as well as compares the GPS readings from each antenna 34 to determine the orientation of excavation machine 12.

The data structure for receiving implement relative positioning data 1030 interfaces with display 64 for any user input data regarding the particular implement being used (or alternatively with another indicator of the implement, such as an RFID reader). Structure 1030 also interfaces with sensors monitoring boom arm 24, dipper arm 26, bucket 28, swing pin 70, boom pin 72, dipper pin 74, and bucket pin 76. These sensors allow computer 80 to calculate the relative position of each piece 24, 26, 28, 70, 72, 74, 76 to antennas 34. This relative positioning data is then passed to structure 1040.

The data structure for calculating implement absolute positioning data 1040 takes the relative positioning data from structure 1030 and combines it with the GPS positioning and orientation data from structure 1025 to determine the physical space inhabited by each piece 24, 26, 28, 70, 72, 74, 76. The data structure for displaying map and positioning data 1060 takes the passed data and presents an integrated data set to display 64.

The data structure for receiving user input 1070 allows a user to interact with display 64 to alter the displayed map and to otherwise initiate other data structures, such as by locating and labeling a new feature on the map. Structure 1070 also receives input regarding desired movement of excavation machine 12, including movement of pieces 24, 26, 28, 70, 72, 74, 76.

The structure for recording map and positioning data 1080 takes the integrated data set from structure 1070 and records the integrated data set to memory 62. The recording structure 1080 may overwrite the originally input map data with the edited map data. Also, the recording structure 1080 may act based upon a user's save request or automatically after a predetermined time.

The data structure for outputting map and positioning data 1090 interfaces with USB port 60 (or other similar interface) to transmit map data, which may be in the form of as-built drawings.

Many of the data structures are implemented in an iterative fashion such that the map on display 64 is constantly being redrawn and the position of excavation machine 12 and its parts is constantly being reassessed. In this way, a real-time representation of excavation machine 12 at the job site is presented on display 64.

To summarize, the system described and claimed may provide the three-dimensional geographic location (X, Y, and Z axis) and dimension of several characteristics of topographic features 100 such as: the dimensions of an excavation; the volume of a feature; the location and height of an above-ground feature; the slope of a surface; the location of a sub-surface utility; or the location of a sub-surface obstruction, all from the operator cab 14 of excavation machine 12.

As illustrated by a simplified example of a right circular cone (FIG. 6), other measurements of angles, slopes, grades and volumes are readily accomplished from the operator cab 14 of excavation machine 12.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A work vehicle for locating a topographic feature at a job site, the work vehicle including:
    a chassis;
    a tool moveably coupled to the chassis to move earth at the job site, the tool configured to be positioned at the topographic feature;
    a positioning system that communicates data related to the geographic location of the work vehicle; and
    a computing system that communicates with the positioning system to determine the geographic location of the tool, the computing system determining the geographic location of the topographic feature based on the geographic location of the tool when the tool is positioned at the topographic feature.

2. The work vehicle of claim 1, further including at least one sensor positioned to detect relative movement between the tool and the chassis.

3. The work vehicle of claim 2, wherein the computing system communicates with the at least one sensor to determine an offset from the geographic location of the work vehicle to the tool, the computing system programmed to combine the geographic location of the work vehicle and the offset to determine the geographic location of the topographic feature when the tool is positioned at the topographic feature.

4. The work vehicle of claim 2, wherein the tool includes at least one tooth, the computing system communicating with the at least one sensor to determine the offset from the geographic location of the work vehicle to the at least one tooth of the tool.

5. The work vehicle of claim 4, wherein the tool includes a right-side tooth and a left-side tooth, the computing system determining the offset from the geographic location of the work vehicle to a preselected one of the right-side tooth and the left-side tooth of the tool.

6. The work vehicle of claim 2, wherein the at least one sensor includes a plurality of sensors located at articulation points between the chassis and the tool.

7. The work vehicle of claim 1, further including a display located within an operator cab of the work vehicle, the display overlaying an image of the work vehicle onto a map at the geographic location of the work vehicle.

8. The work vehicle of claim 7, wherein the geographic location of the work vehicle is iteratively updated to provide a real-time representation of the work vehicle relative to the map.

9. The work vehicle of claim 1, wherein the positioning system includes more than one antenna, the positioning system also communicating data related to the orientation of the work vehicle.

10. A work vehicle for locating a topographic feature at a job site, the work vehicle including:
    a chassis;
    a tool moveably coupled to the chassis to move earth at the job site, the tool configured to be positioned at the topographic feature;
    a positioning system that communicates data related to the geographic location of the work vehicle; and
    a computing system having a memory with software, the software including instructions that, when interpreted by the computing system, perform the steps of:
        determining an offset from the geographic location of the work vehicle to the tool; and
        combining the geographic location of the work vehicle and the offset to determine the geographic location of the topographic feature based on the geographic location of the tool when the tool is positioned at the topographic feature.

11. The work vehicle of claim 10, further including at least one sensor positioned to detect relative movement between the tool and the chassis, the at least one sensor communicating with the computing system to provide data describing the position of the tool to the computing system.

12. The work vehicle of claim 10, wherein the positioning system includes at least one antenna mounted on the chassis of the work vehicle.

13. A work vehicle for locating a topographic feature at a job site, the work vehicle including:
    a chassis;
    a tool moveably coupled to the chassis to move earth at the job site, the tool configured to be positioned at the topographic feature;
    a positioning system that communicates data related to the geographic location of the work vehicle; and a computing system having a memory with software, the software including instructions that, when interpreted by the computing system, perform the steps of:
  determining an offset from the geographic location of the work vehicle to the tool;
  combining the geographic location of the work vehicle and the offset to determine the geographic location of the topographic feature when the tool is positioned at the topographic feature;
  determining a second offset from the geographic location of the work vehicle to the tool;
  combining the geographic location of the work vehicle and the second offset to determine the geographic location of a second topographic feature when the tool is positioned at the second topographic feature; and
  measuring a distance between the geographic locations of the topographic features.

14. The work vehicle of claim 10, wherein the software includes instructions that, when interpreted by the computing system, perform the step of generating a menu of symbols to identify the topographic feature.

15. The work vehicle of claim 14, wherein the software includes instructions that, when interpreted by the computing system, perform the step of displaying a selected symbol from the menu of symbols on a map at the geographic location of the topographic feature.

16. The work vehicle of claim 10, wherein the software includes instructions that, when interpreted by the computing system, record the geographic location of the topographic feature on an as-built drawing.

17. A method for locating a topographic feature at a job site from a work vehicle, the work vehicle having a chassis, the method including the steps of:
  moving a tool relative to the work vehicle to position the tool at the topographic feature;
  determining the geographic location of the tool when the tool is positioned at the topographic feature; and
  determining the geographic location of the topographic feature that corresponds to the geographic location of the tool.

18. The method of claim 17, further including the steps of:
  determining the geographic location of the chassis at the job site;
  determining an offset between the geographic location of the chassis and the tool when the tool is positioned at the topographic feature; and
  using the offset to determine the geographic location of the topographic feature, the geographic location of the topographic feature being separated from the geographic location of the chassis by the offset.

19. The method of claim 18, wherein the using step is performed by a computing system located within an operator cab in the work vehicle.

20. The method of claim 17, wherein the moving step comprises positioning the tool within 4 inches of the topographic feature.

21. The method of claim 17, further including the step of recording the geographic location of the topographic feature on an as-built drawing.

22. The method of claim 17, wherein the tool includes a left-side tooth and a right-side tooth, and wherein the moving step includes positioning a preselected one of the left-side tooth and the right-side tooth of the tool at the topographic feature.

23. A method for locating a topographic feature at a job site from a work vehicle, the work vehicle having a chassis, the method including the steps of:
  moving a tool relative to the work vehicle to position the tool at the topographic feature;
  determining the geographic location of the tool when the tool is positioned at the topographic feature, the geographic location of the topographic feature corresponding to the geographic location of the tool;
  determining the geographic location of a second topographic feature; and
  measuring a distance between the geographic locations of the topographic features.

24. The method of claim 17, wherein the topographic feature includes one of a below-ground utility line, an above-ground post, and an above-ground pile.

* * * * *